(No Model.) 2 Sheets—Sheet 1.

N. ROGERS.
TRUCK.

No. 255,818. Patented Apr. 4, 1882.

Witnesses
Albert H. Adams.
Edgar T. Bond

Inventor:
Nelson Rogers.
By West & Bond.
His Attys.

(No Model.) 2 Sheets—Sheet 2.

N. ROGERS.
TRUCK.

No. 255,818. Patented Apr. 4, 1882.

Witnesses:
Albert H. Adams.
Edgar T. Bond

Inventor:
Nelson Rogers
By West & Bond
His attys.

N. PETERS, Photo-Lithographer, Washington, D. C.

UNITED STATES PATENT OFFICE.

NELSON ROGERS, OF ELGIN, ILLINOIS.

TRUCK.

SPECIFICATION forming part of Letters Patent No. 255,818, dated April 4, 1882.

Application filed July 2, 1881. (No model.)

*To all whom it may concern:*

Be it known that I, NELSON ROGERS, residing at Elgin, in the county of Kane and State of Illinois, and a citizen of the United States, have invented new and useful Improvements in Lifting Platforms or Trucks, of which the following is a full description, reference being had to the accompanying drawings, in which—

Figure 1:
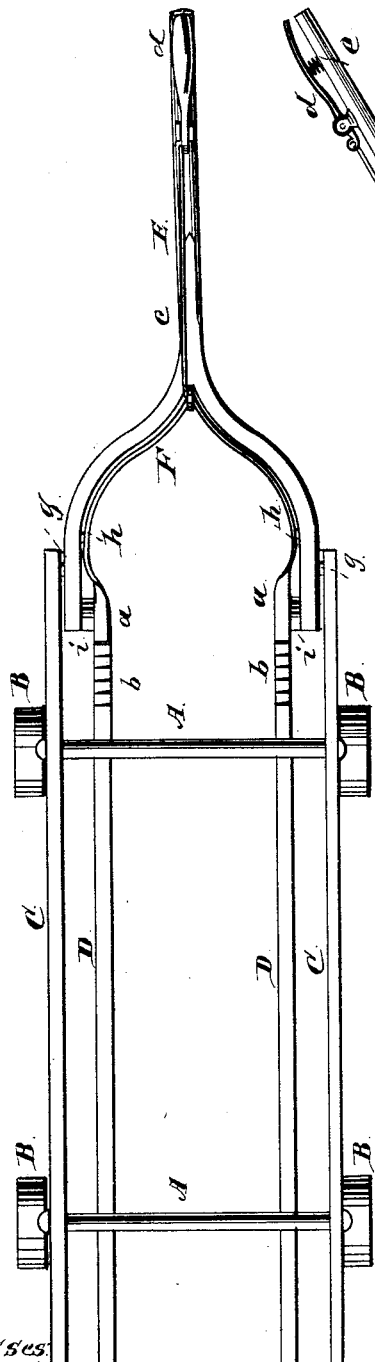
Figure 2:
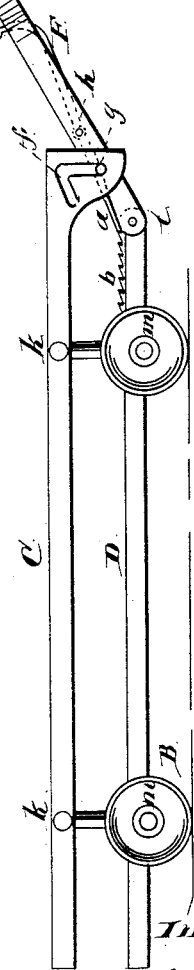
Figure 4:
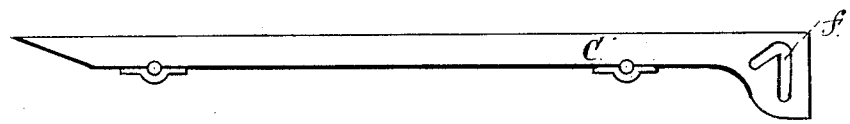
Figure 5:
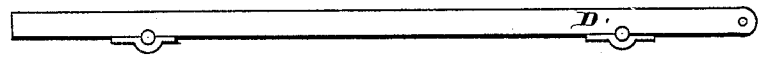
Figure 6:
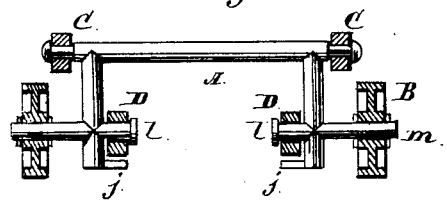
Figure 7:
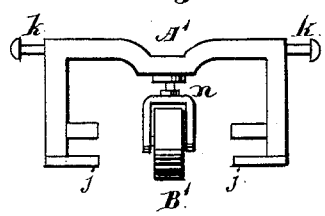
Figure 3:
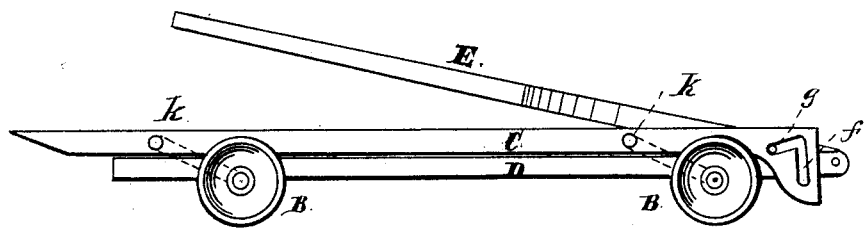

Figure 1 is a top or plan view; Fig. 2, a side elevation, showing the top frame raised; Fig. 3, a similar elevation, showing the top frame down; Figs. 4 and 5, modified constructions of the side rail; Fig. 6, a cross-section; Fig. 7, a modification of the axle adapting it to the use of one wheel or a caster-wheel.

This invention relates to store, platform, and other carrying trucks.

The object of this invention is to improve the construction and operation of such trucks; and its nature consists in the improved parts and combination of parts hereinafter described and claimed as new.

In the drawings, A A' indicate the axles; B, the wheels; B', the caster-wheel; C, the upper side rails, or rails for the platform proper; D, the lower rails; E, the tongue; F, the ratchet-bar; $a$, engaging ends of the ratchet-bar; $b$, ratchet-notches on bars D; $c$, rod connecting the ratchet-bar with the handle or hand-lever; $d$, handle or hand-lever; $e$, spring; $f$, grooves or cams in the side rails, C; $g$, pins moving in the cams $f$; $h$, pivots of the ratchet-bar F; $i$, pivots or hinges of the handle E; $j$, limit-stops on axle A; $k$, pivotal connections for the bars C; $l$, pivotal connections for the bars D; $m$, wheel-spindle, and $n$ caster-fork for the wheel B'.

The axle A is made in the form shown in Fig. 6; but the extension for carrying the stops $j$ may be omitted when the form of rails shown at Fig. 5 is used, for in this case the rail will be high enough for the stop to operate without a pressure carrying downward, and the limit-stop may be made to operate on the upper side of the rail, in which event no downward extension will be required for its application to the axle. The axle is provided with wheel-spindles $m$, and its elevated portion is extended upward according to the elevation desired for the upper frame. On the inside of the elevation the axle is provided with pins or journals $l$, by means of which the bars D are retained in working position, and at the top it is provided with pins or bearings $k$ on the outside, for connecting the upper rails, C, in the platform. The rails D are extended forward, so as to give a proper connection for the tongue, and are provided on the top with ratchet-notches $b$, or a casting is applied thereto having such notches.

The upper side rails, C, are provided with slots or cam-projections $f$, made in the form shown. The tongue E is provided with pins $g$, which operate in the cams $f$, and they are so arranged that the tongue E may be folded down nearly flat on the top of the truck, so as to be out of the way and raised to nearly a vertical position before operating the upper part of the truck, so as to be out of the way when the truck is being loaded. As the pin $g$ passes from the top to the bottom of the front part of the cam or cam-slot by pressure upon the tongue, the upper frame is raised by the action of the pins $g$ moving in the arc of a circle.

As shown, the tongue E is made of a forked bar; but it may be made of side bars connected together with one or more cross-rods, or in any other suitable manner.

To the inside of the tongue or its fork the ratchet-bar F is pivoted with the pins $h$. The lower ends of this bar are flattened or otherwise fixed to engage with the ratchets $b$, and its forward end is raised sufficiently to connect with the rod $c$, which rod connects it with the hand-lever or handle $d$, which handle is provided with a spring, $e$, to hold the ratchet in engagement when it is not held out by the hand. By keeping the ratchet in engagement the truck can be pushed when the tongue is at any elevation, as well as to be drawn along. Another advantage in the ratchet is that the bars C can be held at any elevation, and it is not necessary to raise them to their highest point before moving the truck with its load.

The arrangement of the bars D upon the inner side of the turn of the axle and the bars on the outer side gives ample room for the attachment of the tongue or other operating device, and it also permits the bars C D to pass each other when at their lowest point, so that the bars C can be lowered farther than they could if they were located in the same vertical plane. The stop or stops $j$ limit the upward movement of the frame or platform C sufficiently back of the vertical position of the axle so that the platform or the weight upon it will carry the upper frame down when it is released.

For some purposes it is desirable to make a three-wheeled truck, so arranged that it can be turned around easily. For this purpose I place the axle A′ in the position occupied by either one of the axles A. The only difference between the axle A′ and the axle A is that the wheel-spindles m are omitted, and their place is taken by the caster-fork n, as shown in Fig. 7, in which case the wheel B′ takes the place of the two wheels B.

The arrangement of the bars C D with the cams f and pins g of the tongue causes the point at which the power is applied to be continually moved nearer down toward the level of the bars D, thus giving the application of power a stronger tendency to move the wheels B under instead of traveling the bars C forward, which operation prevents the bars C or platform from being pulled out from under the object or weight to be lifted or moved, as that will remain in the same position, and the wheels and bars D with them take the end movement instead of its being taken by the upper ones, as is the case with the fixed pivots, as in such case, owing to the incline of the bent side portions of the axle, they act as braces to prevent the under part from being moved by the power of the lever handle or tongue, while by my arrangement the application of power is direct from the wheel-spindles, giving the lower portion a greater tendency to move than the upper.

The pivotal pins K may be located in different positions along the bent portions of the axle, so as to use wider or narrower side or platform rails, and the axle may be provided with a series of holes, so as to adjust or vary them in the same truck to adapt it to special positions or work. For this purpose the back or inclined portion of the slot or cam f will be made a little wider. The pins g may be provided with anti-friction collars for their working parts, and with exterior heads or heads and washers to prevent the pins from getting out of place, and the ratchet-teeth b may be applied to the under side, top, or inside of the bars C; but I prefer the location shown, as the ratchet is more out of the way for folding.

The cam ends or heads of the side rails, C, will usually be cast; but when made of wood I either provide them with side plates or metal bushings with or without exterior bands.

What I claim as new, and desire to secure by Letters Patent, is—

1. The axles A, having the pivotal pin k arranged on one side of the bent portions thereof and the pivotal pins i on the opposite side, substantially as described.

2. The combination, in a cranked truck, of the slots or cams f and pins g with a hinged tongue or handle, substantially as set forth.

3. The combination of the tongue or handle E, having the pins g, with the bars C, having slots or cams f, bars D, and crank-axles A, substantially as specified.

4. In a cranked truck, the combination, with the lower rails or frame, D, and the upper rising and falling platform supported by the axles of the truck, of the ratchet-teeth b on the lower rails or frame, the tongue or handle E, hinged to the latter and connected with the rising and falling platform, and the ratchet-bar F on the tongue or handle, said members being arranged to raise, lower, and hold the platform in its adjusted position, whereby it may be pushed or pulled at any partial or complete elevation, substantially as described.

5. In a cranked truck, the combination, with the lower rails or frame, D, the rising and falling rails or platform C, and the tongue or handle E, hinged to the lower rails or frame, of a connection between the tongue or handle and the rising and falling rails or platform, which connection is caused to descend toward the lower rails or frame as the platform is elevated by the movement of the tongue or handle, substantially as described.

NELSON ROGERS.

Witnesses:
L. L. BOND,
B. A. PRICE.